United States Patent Office 3,263,499
Patented August 23, 1966

3,263,499
POLYMER CRYSTALLIZATION METHOD
Michael Wales, Berkeley, Calif., assignor to Shell Oil Company, New York, N.Y., a corporation of Delaware
No Drawing. Filed Sept. 10, 1965, Ser. No. 486,527
The portion of the term of the patent subsequent to Sept. 21, 1982, has been disclaimed
18 Claims. (Cl. 260—93.7)

This application is a continuation-in-part of my co-pending application Serial No. 190,244, filed April 26, 1962, now U.S. Patent No. 3,207,739.

This invention relates to an improved crystallization method for the production of composites of solid crystalline polymers with crystallization modifying additives. The method leads to the production of modified polymers having improved physical properties.

The invention relates more specifically to an improvement in a crystallization method for the production of shaped articles, and of resin composites suitable for use in producing shaped articles, from resins consisting substantially of crystallizable polymer, particularly those produced in the presence of low pressure catalysts of the Ziegler-Natta type. The invention is of outstanding advantage when used with isotactic polypropylene and will be illustrated largely with reference thereto.

Solid polypropylene is a new thermoplastic polymer which has recently achieved commercial importance. By use of appropriate conditions and catalysts it can be produced in a sterically regulated form known as isotactic polypropylene. It is difficult, if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. Typically, polypropylene having a crystallinity of this order contains less than 10% and usually less than 5% of material which is extractable in boiling heptane or isooctane. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though olefin polymers of 100 percent crystal structure are not known to exist. For example, a crystallinity of 70% is extremely high for isotactic polypropylene. Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in decalin at 150° C., is generally between 1.0 and 6 dl./g. but may be as low as 0.5 or less and as high as 10 or more.

Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity, in articles of progressively increased thickness. Another disadvantage of the usual forms of highly crystalline polypropylene is a relatively low impact resistance. This handicaps the use of isotactic polypropylene for making vessels or containers which during use may be subject to mechanical shock.

Polypropylene, like many other crystalline polymers, crystallizes from a melt in a form in which the individual crystals are associated in spheroidal or ellipsoidal bodies known as spherulites. Generally, clarity and some mechanical properties of articles made from polypropylene are better when the spherulites are relatively small.

It is the object of this invention to provide a method of producing improved polyolefin compositions by crystallizing polyolefins in the presence of certain additives which modify the crystallization process and thereby provide substantial improvements in physical properties of solid polypropylene and in mechanical properties of articles produced therefrom, especially those properties which are related to crystallite and spherulite structure of the polymer.

It is another object of this invention to provide articles of crystalline polypropylene which, by virtue of an improved crystal structure, have improved mechanical properties, particularly improved clarity, hardness, tensile properties and injection molding characteristics.

It is a major object of this invention to provide a novel method for causing crystallizable polyolefins, and particularly polypropylene, to crystallize with a very fine spherulite structure.

Other objects will become apparent from the following description of this invention.

According to this invention, solid crystalline polypropylene and other similar solid crystalline polymers of substantially improved physical properties are prepared by carrying out at least the final crystallization from a melt comprising the normally solid, crystallizable polypropylene or other polymer, together with a small, effective amount of at least one of a special group of crystallization-modifying additives.

In another aspect, this invention comprises improved articles of solid crystalline polypropylene or other similar solid crystalline polymers, prepared by crystallizing a melt of crystallizable normally solid polypropylene or other similar polymer, containing a small, effective amount of at least one of said crystallization-modifying additives.

The preferred material which results in the production of solid polypropylene of improved physical properties when used according to this invention is lithium benzoate. Some of the benefits are also obtained by utilizing other salts of lithium and of carboxylic or polycarboxylic acids selected from certain limited groups. For brevity, this group of compounds will sometimes be referred to herein as "compounds of the type of lithium salts of carboxylic acids" or, more briefly, as "carboxylic acid salts." Illustrative compounds of this type are identified in detail hereinafter.

The improvements of this invention are obtained when a compound such as lithium benzoate is present in dissolved or thoroughly dispersed form in the polymer melt prior ot the final crystallization thereof by cooling.

Several properties of the articles produced from normally solid crystalline polymers according to this invention are improved thereby. The improvement will vary, depending on the particular polymer used, other additives used therewith, the particular compound selected from the group of compounds of the type of lithium salts of carboxylic acids, and the conditions under which the final solidification of the melt takes place.

Generally, it is found that the spherulite dimensions in the crystallized articles produced according to this invention are substantially smaller than they would be in an article produced in identical manner from the same polymer but without using one of said compounds of the type of lithium salts of carboxylic acids.

It is also generally found htat the clarity of film or of thicker shaped articles produced from compositions according to this invention is substantially improved, compared to that of articles produced in identical manner from the same polymer without one of said compounds of the type of lithium salts of carboxylic acids, particularly when the final cooling step is under non-flow conditions.

The modulus of elasticity of polymer produced according to this invention generally is increased over that of the identical polymer crystallized in identical manner without one of said compounds of the type of lithium salts of carboxylic acids. Similarly, tensile strength and other tensile properties are improved.

One of the advantages of this invention is that injection molding of polypropylene containing a carboxylic acid salt in accordance with this invention can be successfully carried out over a much wider range of temperature and pressure conditions than in the absence of crystallization modifying compounds. The area of a "molding diagram" for modified polymers, i.e., the area on the plot of cylinder temperature vs. ram pressure which covers satisfactory conditions, is greater than that obtained with unmodified polymer.

Another advantage is that the mixtures according to the invention solidify at a higher temperature than those of identical polymers not containing said compounds of the type of lithium salts of carboxylic acids. Hence, processing can generally be carried out in a shorter period of time. Another advantage of this invention is that it is possible to apply the process to highly crystalline polymers which have a relatively high melt index, allowing their being processed at lower temperatures.

It is further often found that Izod impact resistance is greater in articles produced according to this invention than in those identically produced from identical polymer without one of said compounds of the type of lithium salts of carboxylic acids, particularly when the final cooling step is now non-flow conditions.

My Patent No. 3,207,739 discloses a general superiority of sodium salts of certain carboxylic acids as crystal nucleating agents over salts of other metals of Groups I and II with identical acids. The present invention comprises the use of lithium benzoate and other lithium salts for similar purposes. It has been found that lithium benzoate differs significantly from sodium benzoate in its crystal nucleating effect in polyolefins such as polypropylene, and that other lithium salts also provide effective nucleation.

The effect of elevation of crystallization temperature ($\Delta T$) as measured by differential thermal analysis has been found to be a good general index to crystal nucleating effectiveness of a compound. By this criterion, sodium benzoate, for example, is significantly superior to lithium benzoate in polypropylene. ($\Delta T_{Na}=11°$ C.; $\Delta T_{Li}=6°$ C. in about 0.1% wt. concentration in otherwise comparable compositions.) The relative effectiveness is reversed, however, when some properties of practical interest are considered. For example, see-through clarity of polypropylene films, sheet, or shaped articles crystallized after addition of lithium benzoate is greatly increased compared to that of a similar sample crystallized after addition of sodium benzoate. Improvements of comparable lithium benzoate-nucleated over sodium benzoate-nucleated polypropylene compositions are also observed in Izod impact strength and in heat distortion temperature of injection molded articles.

When similarly prepared samples of crystallized polypropylene containing respectively, sodium benzoate and lithium benzoate are compared under a microscope in polarized light, it is found that the lithium benzoate-containing sample has a significantly finer and more uniform crystal structure. A further advantage of lithium benzoate over sodium benzoate as crystal nucleant for polypropylene is that the former is less sensitive to deactivation during repeated processing involving remelting and crystallizing.

The carboxylic acids whose sodium salts are, in general, effective in accordance with this invention can be broadly classified into two main groups, one of which includes two subgroups, as follows:

(A) Di- and polycarboxylic acids (sometimes referred to herein for brevity as dicarboxylic acid type compounds).

(B) Monocarboxylic acids which contain ring structures.

(1) Monocarboxylic acids having the carbonyl group attached to a ring carbon atom (sometimes referred to herein, for brevity, as benzoic acid type compounds).
(2) Monocarboxylic acids having the carboxyl group attached to an aliphatic carbon atom and a ring attached to another aliphatic carbon atom (sometimes referred to herein, for brevity, as arylalkanoic acid type compounds).

Illustrative compounds of each of these groups are set out below. Lithium benzoate is outstanding in its utility. The effectiveness of individual members of each group varies.

Lithium salts of carboxylic acids are a well-known group of chemicals. The lithium salts which are used according to this invention may be represented by the general formula $Li_mX$ where $m$ is the valence of X, and X is the carboxylic acid anion, selected from the group of carboxylic acids listed below.

A. DICARBOXYLIC ACID TYPE COMPOUNDS

The group of dicarboxylic acid type compounds whose lithium salts may be used in accordance with this invention includes saturated aliphatic dicarboxylic acids, preferably having at least 4 and up to 12 carbon atoms per molecule, saturated cycloaliphatic dicarboxylic acids and aromatic polycarboxylic acids. The following are illustrative:

Lithium salts of acids of 4 to 12 carbon atoms, e.g., of succinic, glutaric and adipic acid and with those of the higher acids have even numbers of carbon atoms per molecule, such as suberic, sebacic, and tetramethyladipic acid.

Lithium salts of saturated cycloaliphatic dicarboxylic acids, such as cis-1,4-cyclohexanedicarboxylic acid, 1,2-cyclohexanedicarboxylic acid and 1,1-cyclohexanedicarboxylic acid.

Lithium salts of orthophthalic acid, metaphthalic acid and tetramethylterephthalic acid.

Lithium salts of other dicarboxylic acids, e.g., of aryl-substituted aliphatic dicarboxylic acids such as paraxylyl succinic acid and 3-phenylbutanedicarboxylic acid.

Lithium salts of polycarboxylic acids having more than two carboxylic acid groups per molecule, e.g., of pyromellitic acid.

B. (1) BENZOIC ACID TYPE COMPOUNDS

The group of benzoic acid type acids whose lithium salts may be used in accordance with this invention includes benzoic acid itself, hexahydrobenzoic acid (cyclohexanecarboxylic acid), and substituted benzoic and hexahydrobenzoic acids. All the acids of this group have in common that they are carbocyclic monocarboxylic acids whose carboxyl group is attached to a carbocyclic nucleus, which may be aromatic or aliphatic. The group of benzoic acid type compounds further includes heterocyclic monocarboxylic acids whose carboxyl group is attached to a ring carbon atom.

Substituted benzoic, hexahydrobenzoic and heterocyclic acids include those having one or more hydrocarbon groups substituted on the nucleus, e.g., those with 1 to 6 carbon atoms per substituent group, preferably those with alkyl substituents; cycloalkyl and aryl substituents may also be present. Typical alkyl substituted benzoic acids are o-methylbenzoic acid, p-methylbenzoic acid, p-ethylbenzoic acid, p-isopropylbenzoic acid, p-tert.butylbenzoic acid and o-tert.butylbenzoic acid, 2,4-dimethylbenzoic acid and 2,4,6-trimethylbenzoic acid, and p,n-heptylbenzoic acid. Other substituted benzoic acids include alpha naphthoic acid and p-cyclohexylbenzoic acid.

Lithium salts of alicyclic compounds corresponding to the above aromatic compounds are included, for example, salts of cyclohexane carboxylic acid, 1-methylcyclohexane carboxylic acid, cis-4-tert.butylcyclohexane carboxylic acid, cis-4-neopentylcyclohexane carboxylic acid, trans-4-methylcyclohexane carboxylic acid and trans-4-tert.butyl cyclohexane carboxylic acid. Heterocyclic acids include 2-furane carboxylic acid (pyromucic acid) and gamma-pyridine carboxylic acid (isonicotinic acid).

Lithium salts of cyclic monocarboxylic acids containing a polar group or atom substituted on the nucleus, e.g., a hydroxy-, alkoxy-, amino- or esterified carboxyl-group or a halogen atom, alone or together with one or more hydrocarbon group substituents, include m-hydroxybenzoic acid, p-hydroxybenzoic acid, o-chlorobenzoic acid, p-chlorobenzoic acid, m-nitrobenzoic acid, 3,5-dinitrobenzoic acid, o-aminobenzoic acid, p-aminobenzoic acid, p-acetamidobenzoic acid, o-formylbenzoic acid and p-methoxybenzoic acid, salicyclic acid (o-hydroxybenzoic acid), o-mercaptobenzoic acid, m-chlorobenzoic acid, p-nitrobenzoic acid, 3-methylsalicyclic acid, dichlorosalicyclic acid, 2,5-dichlorosalicyclic acid, 2,5-dihydroxybenzoic acid and 3,5-dihydroxybenzoic acid.

B. (2) ARYL-ALKANOIC ACID TYPE COMPOUNDS

The group of arylalkanoic acid type compounds whose lithium salts may be used in accordance with this invention includes as preferred compound lithium salt of phenyl acetic acid.

The arylalkanoic acid type compounds may be designated terminal aliphatic monocarboxylic acids substituted with at least one carbocyclic group per molecule. The acids may contain from 8 to 25 carbon atoms, including from 1 to 4 carbon atoms in the alkyl group attached to the carboxyl group. Said carbocyclic groups may be aryl, aralkyl, arylalkenyl, cycloalkalkyl or cycloalkalkenyl groups. The acids may contain as further substituents aliphatic hydrocarbon groups; the acids may be substituted with hydroxyl groups, amino groups, or halogen atoms.

The following compounds are illustrative of this group: lithium salts of phenyl acetic acid, beta-phenyl-beta-methylbutyric acid; and alpha-phenyl-alpha-methylpropionic acid.

Other suitable acids of this group carry hydroxyl, amino or halogen substitution in the aliphatic chain as in beta,beta - di(p-tert.butylphenyl)alpha-hydroxypropionic acid and in benzilic acid (diphenylglycolic acid).

Cycloalkyl substituted alkanoic acids include, for example, cyclohexylacetic acid, beta-cyclohexylpropionic acid and beta-cyclohexylbutyric acid.

The carboxylic acid salts are used in effective concentrations in the range from 0.0001 to 2 percent by weight. The most effective compounds are preferably employed in concentrations below 0.5 percent, e.g., between 0.001 and 0.3 or up to 0.5 percent. Other compounds may be used in amounts up to 1 percent.

The process of this invention may be carried out with a single crystallization modifying compound of the type described, or with a mixture of two or more of such compounds.

If desired, other additives may be present in the olefin polymer. Crystallization modifying additives of other types may be added. Other additives, which are conventionally added, include antioxidants, stabilizers against ultraviolet radiation, and the like. They may be added at any convenient stage of processing.

The present invention is advantageous when used with clear, unpigmented, unfilled polymers. However, the additives of this invention are also compatible with conventional fillers and pigments.

While this invention is most advantageous in providing improved articles of crystalline polypropylene it may also be employed with advantage in improving products made from other crystallizable hydrocarbon polymers, particularly alpha-olefin polymers and copolymers. Specific examples are linear polymers of ethylene, 1-butene, 4-methyl-1-pentene, and 1-hexene, crystalline copolymers of propylene with ethylene, 1-butene and the like, and crystalline polystyrene. Particularly desirable improvements are obtained, for example, in block polymers, such as those consisting predominantly of isotactic polypropylene having small amounts of ethylene, e.g., between 1 and 10 percent, copolymerized therewith by block polymerization. A preferred group of isotactic polymers of alpha-monoolefins having at least 3 and up to 8 carbon atoms per molecule. Polymers which can be improved according to this invention have molecular weights and crystallinities in the range described above for polypropylene.

In one mode of practicing this invention, elastomeric polymer is added to the polyolefin as a property-modifying additive, together with a carboxylic acid salt. The addition of elastomers is known to confer an improvement in some of the mechanical properties of crystalline polymers, e.g., the impact strength. Suitable elastomers include copolymers of ethylene with alpha olefins such as propylene or 1-butene, or other elastomeric olefin copolymers. Other elastomers may be used, such as polyisobutylene, butyl rubber, butadiene-styrene copolymer (SBR), butadiene-acrylonitrile copolymer (NBR), polybutadiene or polyisoproprene of high cis-1,4 content, and the like. The elastomers which are added preferably have weight average molecular weights in excess of 50,000, suitably from 100,000 to 500,000. Elastomer may be added in concentrations up to 35 percent by weight, preferably between 3 and 15 percent.

The polymers which are modified according to this invention are produced by polymerizing propylene or other suitable olefins by contact with a highly stereospecific catalyst system. A great variety of stereospecific catalysts have been described in the literature. They are generally species or modifications of the so-called Ziegler catalysts. The term "Ziegler catalyst" has come to mean, and is used herein to mean, both the "Ziegler-type" and the "Natta-type" catalysts of the following paragraph.

The Ziegler-type catalysts may be designated "metal alkyl-reducible metal halide type" and the Natta-type catalysts "preformed metal subhalide type." This terminology is used, for example, in "Polyolefin Resin Processes" by Marshall Sittig, Gulf Publishing Company, Houston, Texas, 1961. These well-known catalysts are the reaction products of halides, in order of preference chlorides and bromides, of transition metals from subgroup b of groups 4 and 5 of the Periodic Chart of Elements, i.e., of Ti, Zr, Hf, V, Nb or Ta, with organometallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystallizable alpha-olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue. The resulting polymer almost invariably contains at least traces of the catalyst residue. Typically it may contain 50 parts per million (p.p.m.) of each of the catalyst components, calculated as the corresponding metal. A carefully purified polymer may contain as as little as 1 p.p.m. of each metal or less. The additives of this invention are uniquely useful in polymers which contain relatively low amounts of the residue of said catalyst components, e.g., less than 50 p.p.m. calculated as the corresponding metal, and especially in those containing from 0 to 10 p.p.m. However, they provide equally good results when used in polymers containing large amounts of catalyst residue.

Various methods may be employed for introducing the additive of this invention into the polymer. It is generally preferred to add the additive after the polymerization reaction has been completed, the active catalyst has been killed and the predominant part of the catalyst residue washed out of the polymer. The additive may, for example, be added to the washed polymerization slurry; the slurry is then dried and a dry mixture of additive and polymer is recovered. Alternatively, additive may be added to the dry polymer either when the polymer is in the form of a powder fluff or in the form of shaped pellets or the like. It is also possible to add the additive to the crystallizable polymer after it has been melted.

It is essential for effective results that a substantially homogeneous distribution of the additive in the molten polymer be obtained prior to the final crystallization of the polymer. To promote mixing of the polymer and the additive it is best to apply temperatures at which the polymer has a relatively low viscosity, i.e., a temperature exceeding the melting temperature of the polymer by from 20° to 50° C. The additives may be present in the polymer melt in true solution or in uniform dispersion, e.g., as colloidal suspensions of liquids or solids. In one mode, extreme effectiveness is obtained by using them as solids of from 0.01 to less than 1 micron diameter.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

An essential step in the process according to this invention is the cooling of the polymer containing the carboxylic acid salts as additive at conditions resulting in a crystalline polymer structure. The final cooling step in the production of a shaped article determines those of its effective properties which depend on crystal structure. Whereas in the absence of the additives of this invention slow cooling leads to formation of excessively large spherulites, and rapid cooling tends to lead to incompletely crystallized polymer, i.e., polymer having a lower degree of crystallinity than it is capable of achieving, the use of additives of this invention generally result in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

Shaped articles from product according to this invention may be, for example, bars, sheets, films, bands, granules, rods or flakes, molded or extruded large or small shapes or filament. Shaped articles according to this invention may be manufactured from the mixtures according to this invention by casting, compression molding or injection molding; films may be obtained by blowing or by slit extrusion; filaments, bars, bands and the like, may be obtained by extrusion. If desired, these can be reduced, by chopping, to the form of granules, chips or the like. Filaments can be stretched to obtain further improvement of properties. Other known methods of forming shaped polyolefin articles are equally adapted to use with mixtures according to this invention.

The invention will be further described by reference to the following examples, which are not to be interpreted as limiting the invention but are merely intended to be illustrative of preferred modes of practicing the invention.

One of the techniques employed for testing the effectiveness of the additives of this invention is differential thermal analysis. In this method, temperature changes of a sample of the crystallizable polymer are studied by measuring the temperature difference between the sample and an inert material as both are simultaneously heated or cooled under identical heat transfer conditions. When the polymer sample has been heated substantially above its crystallization temperature and is then cooled at a controlled rate, it is found that a point is reached at which crystallization of the supercooled polymer suddenly proceeds rapidly. The temperature of the polymer sample then rises substantially during a short period of time, due to the heat liberated by the crystallization process. The temperature at which this sudden temperature rise due to rapid crystallization is initiated in a given polymer sample is found to be much higher in the presence of crystallization modifying compounds of this invention. For example, when in the absence of crystallization modifying additives the temperature of crystallization of a given polypropylene sample is 129° C., it is found that an effective amount of an additive according to this invention, such as 0.2% by weight of lithium benzoate, causes rapid crystallization to be initiated at a temperature of about 136° C.

A value designated "limiting crystallization temperature" or "$t_{lim}$" is obtained by differential thermal analysis of samples containing various concentrations of additive increasing in small increments from zero. Ultimately, further increases in concentration of additive cause no further increase in crystallization temperature. The temperature thus measured is $t_{lim}$. When $t_{lim}$ values of a variety of additives are determined with identical substrates in a single experimental apparatus, then $t_{lim}$ values are characteristic of each additive. While variations in substrates and variations in apparatus can cause some differences in $t_{lim}$ values of a given additive in a given type of polymer, they do not significantly change the relationship of $t_{lim}$ of different additives to each other.

Another method for testing the effectiveness of the additives of this invention is by their effect on the shear modulus of the polymer. This is a well-known physical property, tested by measuring the deformation of a strip of the polymer under torsion. It is affected by the crystal structure of the polymer.

In the examples, the polypropylene is of the type produced by polymerizing propylene by means of catalyst comprising the reaction product of $TiCl_3$ and an aluminum alkyl compound at conventional low pressure polymerization conditions favoring the production of isotactic polymer. Parts and percentages are by weight unless otherwise indicated.

EXAMPLE 1

Shear modulus test bars are prepared from polypropylene nibs containing oxidation inhibitor. In one sample, 0.1% by weight of purified lithium benzoate is combined with the polymer by milling at about 225° C. In each instance the polymer is compression molded in an electrically heated mold at about 220° C. and about 1000 p.s.i. The mold is then cooled below the melting point of polypropylene by passing steam through appropriate channels in the mold.

Presence of the additive results in a material which has after 2 hours the shear modulus that a sample without additive attains only after a much longer period, and whose ultimate shear modulus is higher than that of a sample without additive. This is believed to be due to modification of the crystal structure of the polymer due to presence of lithium benzoate.

EXAMPLES 2–11

To illustrate the effectiveness of lithium salts of various carboxylic acids, samples were studied by differential thermal analysis. The results are reported as limiting crystallization temperatures in Tables 1 and 2. The "control" values show a slight difference in the unmodified substrates used in the two series.

*Effect of lithium salts of carboxylic acids on crystallization of polypropylene*

TABLE 1

| Example | Acid | $t_{lim}$, ° C. |
|---|---|---|
| Control | No additive | 129.0 |
| 2 | Benzoic acid | 143.3 |
| 3 | p-Methoxy benzoic acid | 144 |
| 4 | p-Chlorobenzoic acid | 141.9 |
| 5 | p-Methyl benzoic acid | 141.7 |
| 6 | p-Aminobenzoic acid | 139.7 |
| 7 | p-Fluoro benzoic acid | 138.2 |
| 8 | p-Hydroxy benzoic acid | 133.2 |

TABLE 2

| Example | Acid | $t_{lim}$, ° C. |
|---|---|---|
| Control | No additive | 127.1 |
| 9 | Succinic acid | 135.8 |
| 10 | Cyclohexane carboxylic acid | 137.7 |
| 11 | Phenylacetic acid | 140.7 |

EXAMPLES 12–16

The mixtures illustrated in Examples 12–15 were prepared by blending finely ground lithium benzoate in amounts specified in the table, 0.1 phr. of phenolic antioxidant, and 0.25 phr. of dilauryl thiodipropionate with unstabilized polypropylene powder containing <0.01% wt. calcium stearate. The polypropylene originally had a melt flow of 3.8.

Properties were measured on tensile bar specimens prepared and tested according to ASTM procedures.

Example 16 gives representative comparable values for products similarly prepared with sodium benzoate as additive.

TABLE 3

| Example | 12 | 13 | 14 | 15 | 16 |
|---|---|---|---|---|---|
| Lithium Benzoate, phr | 0 | 0.1 | 0.2 | 0.5 | (4) |
| Melt Flow, dl./min.[1] | 4.3 | 4.5 | 5.3 | 4.9 | 4 |
| Crystallization Temp., ° C.[2] | 128.0 | 134.0 | 136.4 | 136.4 | 139 |
| Crystallinity, percent[3] | 68.2 | 68.7 | 68.0 | 67.9 | |
| *ASTM TYPE I TENSILE BARS* | | | | | |
| Tensile Properties at 0.2 in./min.: | | | | | |
| Yield Strength, p.s.i. | 4,480 | 4,780 | 4,800 | 4,810 | 5,050 |
| Elongation at Yield, percent | 9.0 | 9.0 | 9.0 | 9.0 | 9.0 |
| 1% Secant Modulus, p.s.i.×10⁻⁵ | 2.08 | 2.22 | 2.21 | 2.23 | 2.47 |
| Tensile Properties at 2 in./min.: | | | | | |
| Yield Strength, p.s.i. | 5,110 | 5,410 | 5,470 | 5,480 | 5,950 |
| Elongation at Break, percent | 214 | 213 | 245 | 197 | |
| Ultimate Strength, p.s.i. | 2,750 | 3,390 | 2,730 | 3,170 | |
| Flexural Modulus, p.s.i.×10⁻⁵ | 1.93 | 2.20 | 2.15 | 2.20 | 2.48 |
| Izod Impact Strength, ft.-lb./in. notch | 0.81 | 1.38 | 1.55 | 1.67 | 0.8 |
| Hardness, Rockwell "R" Scale | 89 | 92 | 90 | 92 | 85 |
| Vicat Softening Point, ° C | 155 | 155 | 153 | 151 | |
| Deflection Temp., ° C (66 p.s.i. fiber stress) | 101 | 108 | 118 | 106 | |
| Density, gm./cc. | 0.903 | 0.907 | 0.906 | 0.907 | |

[1] Melt flow measured on injection-molded tiles.
[2] Crystallization temperature by DTA on nibs.
[3] Crystallinity by torsion pendulum on annealed compression molded specimens.
[4] Average of samples containing 0.05–0.08% wt. sodium benzoate.

I claim as my invention:

1. The method of producing low ash polypropylene articles of improved clarity, hardness, Izod impact strength, and tensile strength which comprises
    (a) dispersing in
        (1) polypropylene having a viscosity average molecular weight of at least 40,000 and a crystallinity of at least 50 percent, as measured by X-ray analysis
        (2) lithium salt of benzoic acid in an amount in the range 0.001 to 1 percent by weight, based on the polymer,
    (b) melting the resulting mixture,
    (c) shaping the melt into a desired shape, and
    (d) solidifying the melt by cooling it.

2. The method of crystallizing crystallizable polypropylene which comprises
    (A) producing a melt of
        (1) normally solid, crystallizable polypropylene containing
        (2) an effective amount, in the range from 0.0001 to 2 percent by weight, of a crystallization modifying salt $Li_mX$ where $m$ is the valence of X, and X is the anion of a carboxylic acid from the following group:
            (a) cyclic monocarboxylic acids, free of olefinic unsaturation, whose carboxyl group is attached to a carbon atom of a 5- to 6-membered ring;
            (b) polycarboxylic acids selected from the following group:
                (i) aromatic polycarboxylic acids having from 2 to 4 carboxyl groups per molecule and free of olefinic unsaturation,
                (ii) saturated cycloaliphatic dicarboxylic acids,
                (iii) saturated aliphatic and saturated hydrocarbon-substituted aliphatic terminal dicarboxylic acids having from 4 to 12 carbon atoms per molecule; and
            (c) terminal aliphatic monocarboxylic acids substituted with at least one carbocyclic group per molecule;
    (B) and solidifying said melt by cooling it.

3. A method according to claim 2 wheerin said carboxylic acid is a monocarboxylic acid containing a carboxyl group and a hydrocarbon group substituent, both attached to a benzene nucleus.

4. A method according to claim 2 wherein said carboxylic acid is benzoic acid.

5. A method according to claim 2 wherein said carboxylic acid is p-methylbenzoic acid.

6. A method according to claim 2 wherein said carboxylic acid is p-methoxybenzoic acid.

7. A method according to claim 2 wherein said carboxylic acid is a terminal aliphatic monocarboxylic acid substituted with at least one carbocyclic group per molecule.

8. A method according to claim 2 wherein said carboxylic acid is phenylacetic acid.

9. A method according to claim 2 wherein said carboxylic acid is a saturated aliphatic dicarboxylic acid.

10. A method according to claim 2 wherein said carboxylic acid is succinic acid.

11. The method of crystallizing a crystallizable polyolefin which comprises
    (A) producing a melt of
        (1) a normally solid, crystallizable polymer of an alpha-monoolefin having from 3 to 8 carbon atoms per molecule, containing
        (2) an effective amount, in the range from 0.0001 to 2 percent by weight, of a crystallization modifying salt $Li_mX$ where $m$ is the valence of X, and X is the anion of a carboxylic acid from the following group:
(a) cyclic monocarboxylic acids, free of olefinic unsaturation, whose carboxyl group is attached to a carbon atom of a 5- to 6- membered ring;
(b) polycarboxylic acids selected from the following group:
(i) aromatic polycarboxylic acids having from 2 to 4 carboxyl groups per molecule and free of olefinic unsaturation,
(ii) saturated cycloaliphatic dicarboxylic acids,
(iii) saturated aliphatic and saturated hydrocarbon-substituted aliphatic terminal dicarboxylic acids having from 4 to 12 carbon atoms per molecule; and
(c) terminal aliphatic monocarboxylic acids substituted with at least one carbocyclic group per molecule;
(B) and solidifying said melt by cooling it.

12. A method according to claim 11 wherein said polyolefin is a block polymer consisting predominantly of polypropylene and to a minor extent of other alpha-monoolefin polymers.

13. As a manufacture, polypropylene produced by the method of claim 1.

14. As a manufacture, polypropylene produced by the method of claim 2.

15. As a manufacture, polypropylene produced by the method of claim 5.

16. As a manufacture, polypropylene produced by the method of claim 6.

17. As a manufacture, polypropylene produced by the method of claim 8.

18. As a manufacture, polypropylene produced by the method of claim 10.

References Cited by the Examiner
UNITED STATES PATENTS
3,207,739  9/1965  Wales _____ 260—94.9

JOSEPH L. SCHOFER, *Primary Examiner.*

L. EDELMAN, *Assistant Examiner.*